United States Patent
Higashikawa et al.

(10) Patent No.: US 10,788,669 B1
(45) Date of Patent: Sep. 29, 2020

(54) SYSTEM AND ASSEMBLY FOR CONTROLLING TEMPERATURE IN HEAD-UP DISPLAYS

(71) Applicants: DENSO International America, Inc., Southfield, MI (US); Denso Corporation, Kariya (JP)

(72) Inventors: Emma Higashikawa, Farmington Hills, MI (US); Juan Martinez, Farmington, MI (US); Yusuke Matsui, West Bloomfield, MI (US); Keitaro Yoshioka, Farmington Hills, MI (US)

(73) Assignees: DENSO INTERNATIONAL AMERICA, INC., Southfield, MI (US); DENSO CORPORATION (JP)

( * ) Notice: Subject to any disclaimer, the term of this patent is extended or adjusted under 35 U.S.C. 154(b) by 0 days.

(21) Appl. No.: 16/528,771

(22) Filed: Aug. 1, 2019

Related U.S. Application Data

(60) Provisional application No. 62/831,290, filed on Apr. 9, 2019.

(51) Int. Cl.
  *G02B 27/01* (2006.01)
  *B60K 35/00* (2006.01)

(52) U.S. Cl.
  CPC .......... *G02B 27/0149* (2013.01); *B60K 35/00* (2013.01); *G02B 27/0101* (2013.01); *B60K 2370/1529* (2019.05)

(58) Field of Classification Search
  None
  See application file for complete search history.

(56) References Cited

U.S. PATENT DOCUMENTS

| 3,392,297 A * | 7/1968 | Schwartz ................ H01J 29/32 313/466 |
| 9,188,779 B2 | 11/2015 | Sakai |
| 2009/0103000 A1* | 4/2009 | Monden ............ G02F 1/133502 349/58 |
| 2012/0256895 A1* | 10/2012 | Azumada ............ G02F 1/13476 345/211 |
| 2016/0320691 A1 | 11/2016 | Andreev |
| 2019/0018241 A1* | 1/2019 | Haruyama ............. G02B 27/01 |

FOREIGN PATENT DOCUMENTS

| KR | 20110109223 A | 10/2011 |
| WO | 2015159030 A1 | 10/2015 |
| WO | 2018002188 A1 | 1/2018 |

OTHER PUBLICATIONS

WO2011040671A1 "Light emitting diode lighting apparatus" Lee 2011 (original and machine translation attached) (Year: 2011).*
Machine translation of WO2011040671A1 WO2011040671A1 (Year: 2011).*

* cited by examiner

*Primary Examiner* — Matthew Yeung
(74) *Attorney, Agent, or Firm* — Brooks Kushman P.C.

(57) ABSTRACT

A head-up display (HUD) assembly for a vehicle is provided. A backlight assembly case is made of a material having a thermal conductivity exceeding 15 W/mK and an emissivity of at least 0.8. A light source is provided. A thin film transistor (TFT) panel has a first axial surface and a second axial surface. A portion of light emitted from the light source transmits through the TFT panel from the first axial surface to the second axial surface, and a portion of the TFT panel is mounted to the backlight assembly case in a direct face-to-face relationship.

18 Claims, 4 Drawing Sheets

SYSTEM AND ASSEMBLY FOR CONTROLLING TEMPERATURE IN HEAD-UP DISPLAYS

CROSS-REFERENCE TO RELATED APPLICATIONS

This application claims the benefit of U.S. provisional application Ser. No. 62/831,290 filed Apr. 9, 2019, the disclosure of which is hereby incorporated in its entirety by reference herein.

TECHNICAL FIELD

The present disclosure relates to a system and assembly for controlling temperature of a display in a head-up display.

BACKGROUND

Various automotive vehicles have a head-up display (HUD) system. In a HUD system, a light source projects a light, which is reflected onto a windshield of the vehicle. The focal point of the light is out beyond the vehicle, enabling the driver of the vehicle to view the light on the windshield without changing focus while looking at the outside environment.

SUMMARY

In one embodiment, a head-up display (HUD) assembly for a vehicle is provided. A backlight assembly case is made of a material having a thermal conductivity exceeding 15 W/mK and an emissivity of at least 0.8. A light source is provided. A thin film transistor (TFT) panel has a first axial surface and a second axial surface. A portion of light emitted from the light source transmits through the TFT panel from the first axial surface to the second axial surface, and a portion of the TFT panel is mounted to the backlight assembly case in a direct face-to-face relationship.

In another embodiment, a HUD assembly for a vehicle is provided. A light source is configured to transmit a light. A pair of lenses is configured to distort the light. A spacer is connected to and between the pair of lenses to maintain a space between the lenses. A thin film transistor (TFT) panel configured to receive the light passed through the pair of lenses. A backlight assembly case houses the light source, the lenses, and the spacer. The backlight assembly case is in direct contact with the TFT panel, and the backlight assembly case is made of a material having a thermal conductivity exceeding 15 W/mK.

In another embodiment, a HUD device includes a backlight assembly case, a light source housed within the backlight assembly case, and a thin-film transistor (TFT) panel configured to receive light transmitted from the light source. The TFT panel has a first surface, an opposing second surface, and an outer edge between the first surface and the second surface. The first surface and the outer edge directly contact the backlight assembly case to facilitate heat transfer from the TFT panel to the backlight assembly case

DETAILED DESCRIPTION

Embodiments of the present disclosure are described herein. It is to be understood, however, that the disclosed embodiments are merely examples and other embodiments can take various and alternative forms. The figures are not necessarily to scale: some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A head-up display (HUD), also referred to as a heads-up display, is a type of transparent display that presents data without requiring the user to look away from the usual environment. In vehicular applications, data can be presented on the windshield (for example), in a transparent and visually-unobstructed manner so that the driver can clearly see the surrounding environment while driving. Some data available for display on the windshield includes vehicle speed, turn-by-turn navigation instructions, warnings regarding surrounding objects, etc.

Figure 1:
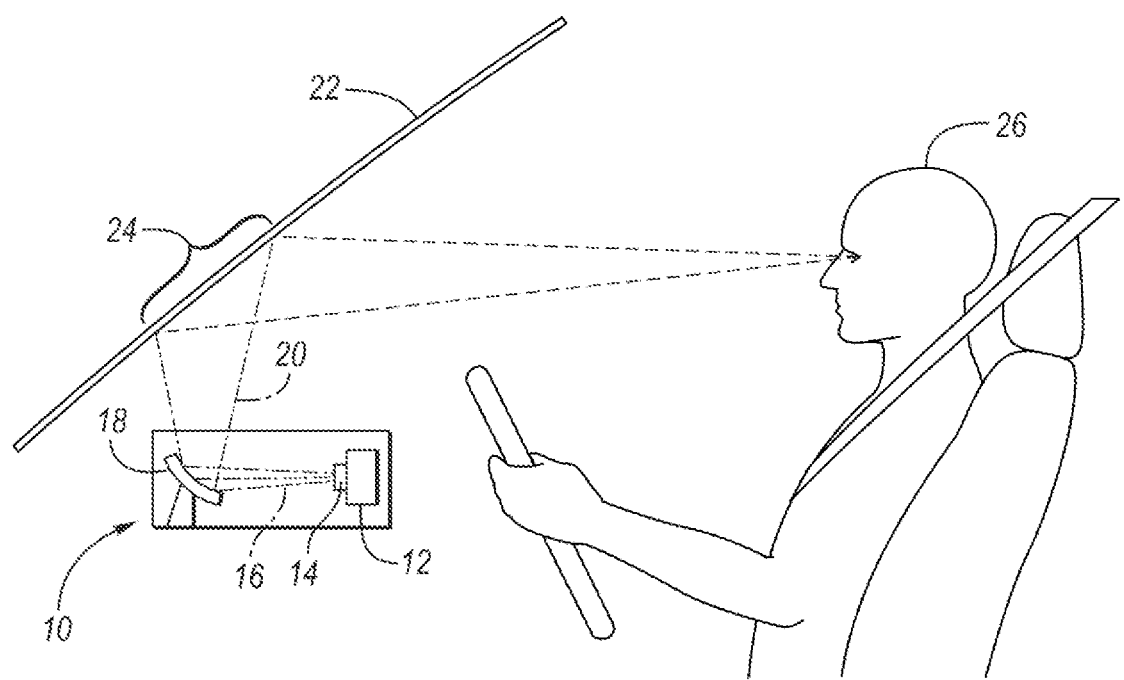
FIG. 1 illustrates a side schematic view of a HUD system, according to one embodiment.

FIG. 1 illustrates a general HUD system 10 according to one embodiment. The HUD system 10 is in a vehicle, such as a car, truck, sports utility vehicle, van, and the like. The HUD system 10 includes various components beneath the dashboard of the vehicle. For example, the HUD system 10 can include a projector unit 12. For simplicity sake, the projector unit 12 is shown herein to have a light source 14, which can be a light-emitting diode (LED) light source located at the rear of the projector unit 12, for example. Light transmitted from the light source 14 is generally shown at 16. The light from the light source 14 is sent to a screen or visual display, such as thin-film transistor (TFT), in an embodiment. The TFT can create an image, and the LEDs can light up the image; in other words, the LEDs can be a backlight for the TFT. The light can then be reflected off of a mirror 18. The light reflected off of the mirror 18, shown generally at 20, passes through an aperture or transparent region of the dashboard and is reflected off the vehicle windshield 22 to the driver 26. The light shown on the windshield can be shown over an area 24 of the windshield that can, for example, overlay with the road ahead of the driver 26 from the driver's viewpoint.

While not shown in FIG. 1, the HUD system 10 can include many other components to aid in the effective delivery of light to the windshield, such as collimators, lenses, additional mirrors, and other structure. While the HUD system 10 may TFT, other screens or visual displays may be used, such as a liquid crystal display (LCD), liquid crystal on silicon (LCoS), digital micro-mirrors (DMDs), organic light-emitting diodes (OLEDs), or others made using a wide variety of semiconductor materials (e.g., silicon, glass, cadmium selenide, metal oxides, etc.) which is illuminated by the light from the light source as the light as it is projected to the windshield.

Due to compact designs, packaging constraints, light, and power consumption, among other factors, a HUD system is a prime environment for an unwanted increase of heat. If left unaccounted for, the entire HUD system (including the housing, lenses, TFT panel, etc.) can increase in heat to an undesirable level, which could degrade performance of the HUD system.

Some known concepts to reduce the heat of the HUD system include placing a mesh screen, polarizer or filter in the light path that is designed to be hit with the light, and transmit the heat from the light to the outer case or housing. However, this can remove some of the intensity of the light that is eventually intended for traveling to the windshield, and therefore the quality of the light displayed on the windshield is degraded.

According to various embodiments described herein, a HUD system is provided that is specifically tailored for removing heat from the system, particularly the HUD's display. In one example, heat conduction takes place with transferring excess heat directly from the HUD's display via conduction. In another example, heat absorption takes place by absorbing stray light rays (e.g., light rays that do not eventually get transferred to the windshield) within the outer case that would otherwise be absorbed by the display. These embodiments remove heat away from the display to prevent overheating of the HUD's display, improving the operability and efficiency of the display.

Figure 2:
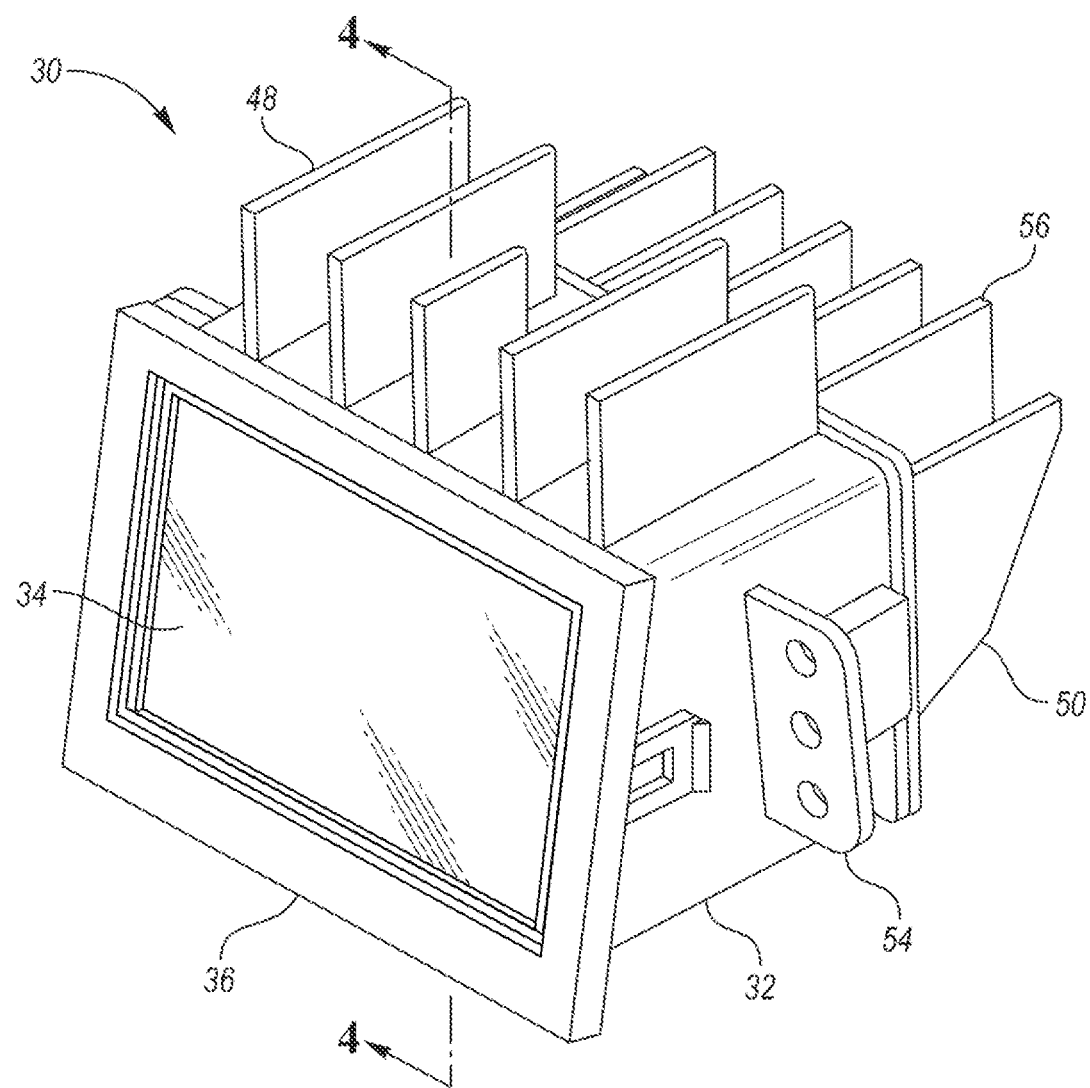
FIG. 2 illustrates a side perspective view of a HUD backlight assembly in an assembled state, according to one embodiment.
Figure 3:
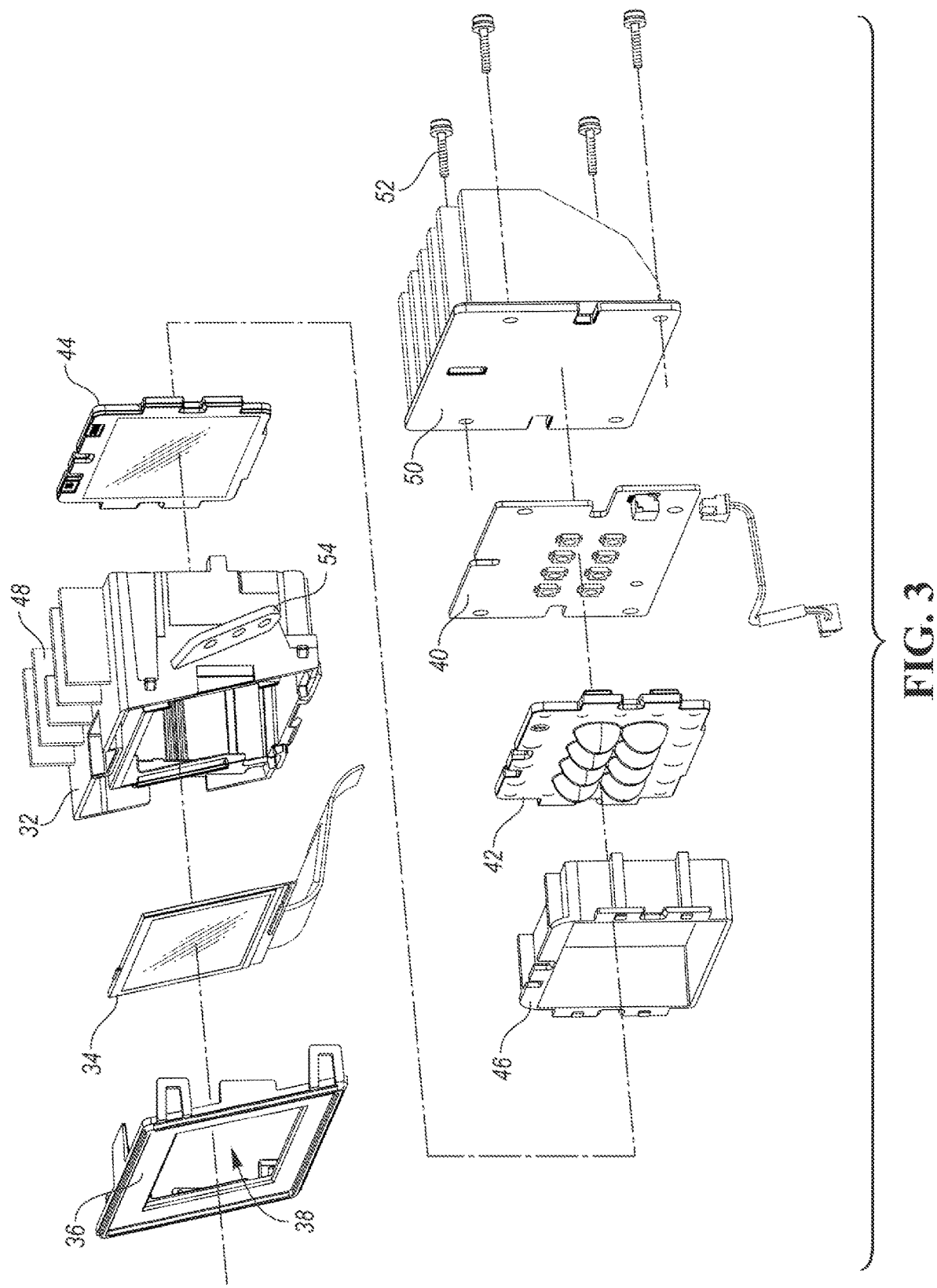
FIG. 3 illustrates an exploded perspective view of the HUD backlight assembly of FIG. 2, according to one embodiment.
Figure 4:
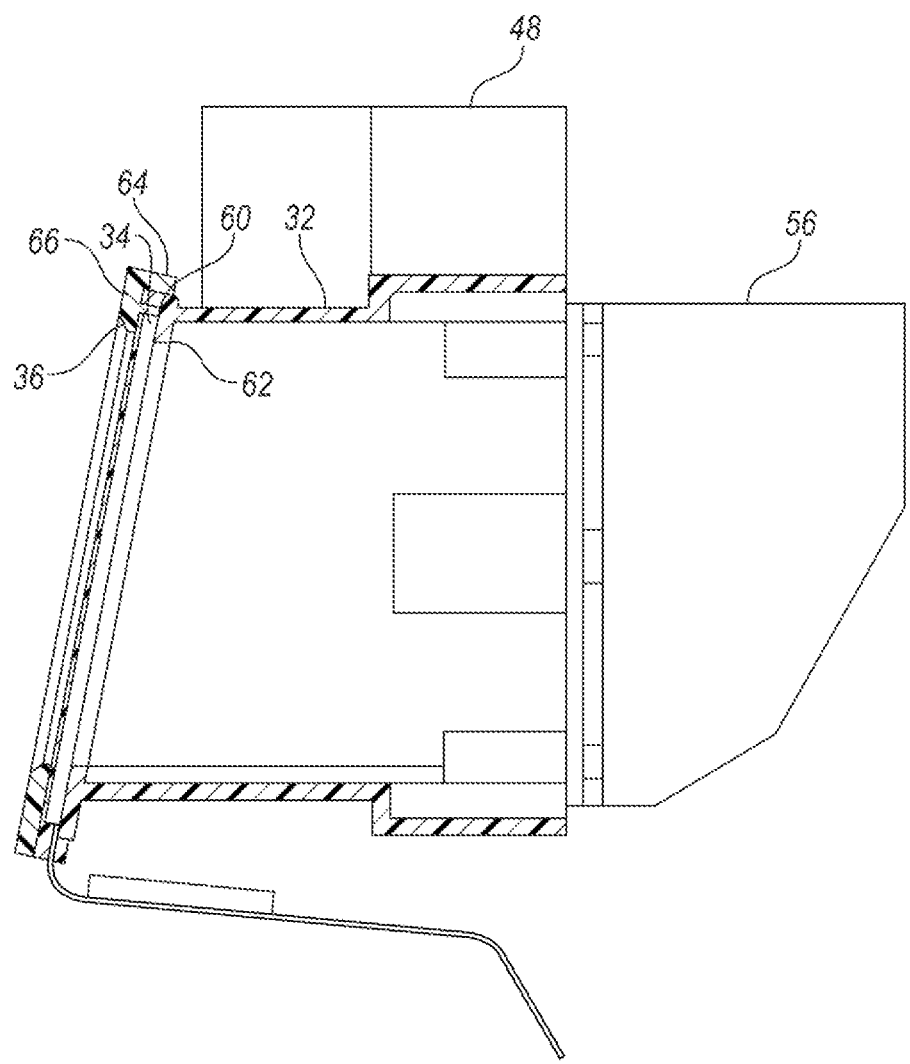
FIG. 4 illustrates a cross-sectional view of the HUD backlight assembly of FIG. 2, according to an embodiment.

FIG. 2 illustrates a perspective view of a HUD backlight assembly 30 according to one embodiment. FIG. 3 illustrates an exploded perspective view of the HUD backlight assembly 30. FIG. 4 illustrates a cross-sectional view of the HUD backlight assembly 30 along line 4-4 in FIG. 2. The HUD backlight assembly 30 can house the various structures explained above, such as a light source, mirror(s), collimators, etc.

Referring to FIGS. 2-4, the HUD backlight assembly 30 (also referred to as a HUD display assembly) includes an outer housing or case 32, also referred to as a backlight assembly case. The case may support a TFT screen or TFT panel 34, if such a screen is provided in the particular HUD system. The TFT panel 34 is also assembled to a cover 36, which has a central opening 38 aligned with the TFT panel 34 such that the illumination of the TFT panel 34 is visible through the opening 38. The orientation and positioning of the HUD backlight assembly 30 can be such that the TFT panel 34 is directly aligned with an opening in the dashboard of the vehicle. A protective, transparent cover (not shown) may be placed over the opening in the dashboard to protect the TFT panel 34.

The HUD backlight assembly 30 may also include a light source 40, such as one described above. In the illustrated embodiment, the light source 40 is an LED board. A first lens 42 including a plurality of individual lenses arranged on a lens board are also provided, with each lens aligned with a respective one of the LEDs, for example. A second lens 44 is also provided, spaced apart from the first lens 42. A lens spacer 46 may be provided, attached to both lenses 42, 44 and configured to maintain a special relationship between the lenses.

During operation, the nature of the HUD backlight assembly 30 nurtures an environment in which heat can accumulate. The HUD backlight assembly 30 includes several heat-transferring structural members. For example, the TFT case 32 can include a plurality of fins 48 extending vertically from one of the outer surfaces of the TFT case 32. In the illustrated example, the fins 48 extend from an upper surface of the case, toward the overlying dash of the vehicle. As heat rises from the HUD backlight assembly 30, the heat can dissipate to the environment from the fins 48.

The HUD backlight assembly 30 is also provided with a heat sink 50 at a rear of the assembly. The heat sink 50 can be attached directly to the TFT case 32. For example, a plurality of fasteners (e.g., screws, bolts, etc.) 52 can extend through apertures of the heat sink 50 to connect to corresponding holes in a board of the light source 40 to connect the two. Heat generated by the light source 40 can be transmitted to the heat sink 50 whereupon the heat is dissipated to the surrounding environment. The heat sink 50 can also have one or more fins 56 extending upwardly therefrom to further transfer the heat similar to the fins 48 of the TFT case 32. Apertures may also exist in flanges 54 extending from side surfaces of the TFT case 32 for other fasteners (not shown) if desired to mount the HUD backlight assembly 30.

While the fins 48, 56 as well as the heat sink 50 aid in removing heat from the HUD backlight assembly 30, the TFT panel 34 is specifically susceptible for localized increases in heat. As light is transmitted from the light source 40 to the TFT panel 34, the light disperses across the screen; heat is a byproduct. The assembly disclosed herein can reduce and remove the heat contained on the TFT panel 34 in a number of additional ways, including conducting the heat as well as absorbing the heat.

In one embodiment, heat is absorbed within the HUD backlight assembly 30 away from the TFT panel 34. This can be done with a direct mounting of the TFT panel 34 to the TFT case 32. As can be seen in FIG. 4, the TFT panel 34 can be directly connected to and between the TFT case 32 and the TFT cover 36. In one embodiment, the TFT case 32 includes an L-shaped end having an axially-extending portion 60 extending toward the TFT cover 36, and an inwardly-extending portion 62 extending toward the inner region of the TFT case 32. The TFT panel 34 or screen can be in direct contact with one or both of these portions 60, 62 of the TFT case 32. An axial surface of the TFT panel 34 can be in a direct face-to-face contact with the inwardly-extending portion 62. Also, an outer edge of the TFT panel 34 (e.g., facing away from the interior) can be in a direct face-to-face contact with the axially-extending portion 60.

Likewise, the TFT cover 36 can have an L-shaped end having an axially-extending portion 64 extending toward the TFT case 32, and an inwardly-extending portion 66 extending toward the opening 38. The TFT panel 34 or screen can be in direct contact with one or both of these portions 64, 66 of the TFT cover 36. In the illustrated embodiment, an axial surface of the TFT panel 34 can be in direct face-to-face contact with the inwardly-extending portion 66. The axially-extending portion 64 can be in a direct face-to-face contact and overlapping the axially-extending portion 60 of the TFT case 32.

Several direct contacts are made as shown in FIG. 4. The TFT panel 34 may include a first axial surface (e.g., facing inward toward the interior surface of the TFT case 32) and a second axial surface (e.g., facing outward away from the interior surface of the TFT case 32). The first axial surface may be in direct face-to-face contact with the inwardly-extending portion 62 of the TFT case 32. The second axial surface may be in direct face-to-face contact with the inwardly-extending portion 66 of the TFT cover 36. Moreover, the outer edge of the TFT panel 34 (e.g., the outer edge facing upward and away from a center point of the TFT panel 34) can be in direct face-to-face contact with the axially-extending portion 60 of the TFT case 32. And, the axially-extending portion 60 of the TFT case 32 may be in direct face-to-face contact with the axially-extending portion 64 of the TFT cover 36.

The direct face-to-face contacts between the TFT panel 34 and either or both of the TFT cover 36 and TFT case 32 increases heat conducted between the components. Heat transmitted and contained in the TFT panel during operation can be dispersed via the conduction, where it can be dissipated into the environment via the fins 48 explained above, for example. This provides an improved ability to remove heat from the TFT panel 34 than, for example, an air gap located axially between the TFT panel and either or both of the TFT cover 36 and TFT case 32, as heat may not transfer adequately enough across the air gap. Thermally-conductive tape or adhesive can be used at or along at least a portion of the face-to-face connections explained above to facilitate the heat conduction.

In one embodiment, heat is absorbed within the TFT case 32. As light travels from the light source 40, stray light (e.g., light that is produced by the light source 40 but does not make it to the TFT panel 34) can bounce around the interior surfaces of the TFT case 32. Also, the stray light may, after bouncing within the TFT case 32, be absorbed by the TFT panel 34, increasing the heat of the TFT panel 34. Absorbing as much of the stray light as possible before it reaches the TFT panel 34 can aid in reducing the temperature rise of the TFT panel 34. The TFT case 32 may therefore be made of a material that is colored black or a similar dark shade. This facilitates the TFT case 32—rather than the TFT panel 34—to absorb the heat produced by stray light.

Moreover, in HUD systems where non-optical structural components (such as the lens spacer 46 for example) surround the optical path, such structural components will absorb stray light instead of the TFT case 32. Thus, it can be beneficial for the heat of the stray light to be indirectly transferred to the TFT case 32 through the non-optical structural components. Therefore, in some embodiments, such components are made from materials that readily absorb light and exhibit high conductivity. For example, the lens spacer 46, the TFT case 32, etc. can be made of a thermally-conductive plastic, having a thermal conductivity in the range of 1 W/mK to 40 W/mK, and more particularly between 15 W/mK and 40 W/mK, which is anywhere from 5 to 500 times the amount of thermal conductivity in conventional plastics.

In order to facilitate the heat transfer to the TFT case 32 effectively, the non-optical structural components and the TFT case 32 can be in direct physical contact with each other. The components can be adhered via a thermally-conductive tape. In another embodiment the TFT case 32 and the non-optical structural components (e.g., lens spacer 46) are molded as a single part created from the same material.

As explained above, heat is collected at the TFT case 32 in two different modes —absorption and conduction. For example, heat from stray light can be absorbed by the TFT case 32 and the non-optical structure. And, heat can be conducted via physical contact into the TFT case 32. Heat collected by these two modes can then be released to the external environment via radiation, for example, facilitated by the use of a high emissivity material. In order to realize sufficiently high conductivity and high emissivity characteristics, the TFT case 32 can be made of a material (e.g., plastic or metal) with an emissivity greater than 0.8 and a conductivity greater than 15 W/mK. Furthermore, parts surrounding the optical path within the TFT case 32 (such as the lens spacer 46, frame of the lens 44, etc.) can be constructed with a black or dark colored material to absorb the stray light. The parts can be molded from black plastic, or painted with black pigment. And, as explained above, fins 48 can also be utilized to aid in releasing the heat to the external environment via radiation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A head-up display (HUD) assembly for a vehicle, the HUD assembly comprising:
   a backlight assembly case made of a material having a thermal conductivity exceeding 15 W/mK and an emissivity of at least 0.8;
   a light source; and
   a thin film transistor (TFT) panel having a first axial surface and a second axial surface, wherein a portion of light emitted from the light source transmits through the TFT panel from the first axial surface to the second axial surface, and wherein a portion of the TFT panel is mounted to the backlight assembly case in a direct face-to-face relationship;
   wherein the backlight assembly case has an end having an axially-extending portion and an inwardly-extending portion, wherein the axially-extending portion is in direct face-to-face contact with a TFT cover attached to the TFT panel, and wherein the inwardly-extending portion is in direct face-to-face contact with the first axial surface of the TFT panel.

2. The HUD assembly of claim 1, wherein the first axial surface of the TFT panel is in direct contact with the backlight assembly case in a face-to-face relationship.

3. The HUD assembly of claim 2, further comprising a TFT cover defining an opening aligned with the second axial surface of the TFT panel, wherein the TFT cover is in direct contact with the second axial surface of the TFT panel in a face-to-face relationship.

4. The HUD assembly of claim 1, wherein the backlight assembly case has an interior surface that is black to facilitate heat absorption.

5. The HUD assembly of claim 1, wherein the backlight assembly case includes a plurality of fins extending outwardly therefrom to facilitate radiating heat to an external environment.

6. The HUD assembly of claim 1, wherein the thermal conductivity of the backlight assembly case is in a range between 15 W/mK and 40 W/mK.

7. The HUD assembly of claim 1, wherein there is no air gap or insulative material at a contact between the TFT panel and the backlight assembly case.

8. The HUD assembly of claim 1, further comprising non-optical components including a lens spacer, wherein the lens spacer is in direct contact with the backlight assembly case.

9. The HUD assembly of claim 1, further comprising a thermally-conductive tape adhering the backlight assembly case to the TFT panel.

10. A head-up display (HUD) assembly for a vehicle, the HUD assembly comprising:
    a light source configured to transmit a light;
    a pair of lenses configured to distort the light;
    a lens spacer connected to and between the pair of lenses to maintain an axial space between the lenses;
    a thin film transistor (TFT) panel configured to receive the light passed through the pair of lenses; and
    a backlight assembly case housing the light source, the lenses, and the spacer, wherein the backlight assembly case is in direct contact with the TFT panel, and wherein the backlight assembly case is made of a material having a thermal conductivity exceeding 15 W/mK.

11. The HUD assembly of claim 10, wherein the material of the backlight assembly case has an emissivity of at least 0.8.

12. The HUD assembly of claim 10, wherein the backlight assembly case and the spacer are a single integral unit formed from the same material.

13. The HUD assembly of claim 10, wherein the TFT panel has a first axial surface and a second axial surface, and wherein the first axial surface directly contacts the backlight assembly case.

14. The HUD assembly of claim 13, wherein the backlight assembly case has an end having an axially-extending portion and an inwardly-extending portion, wherein the inwardly-extending portion directly contacts the first axial surface in a face-to-face relationship.

15. The HUD assembly of claim 13, further comprising a TFT cover secured to the TFT panel, wherein the TFT cover has an inwardly-extending portion directly contacting the TFT panel in a face-to-face relationship.

16. The HUD assembly of claim 15, wherein the TFT panel is between and directly contacts the TFT cover and the backlight assembly case.

17. A head-up display (HUD) device comprising:
    a backlight assembly case;
    a light source housed within the backlight assembly case; and
    a thin-film transistor (TFT) panel configured to receive light transmitted from the light source, the TFT panel having a first surface, an opposing second surface, and an outer edge between the first surface and the second surface;
    wherein the first surface and the outer edge directly contact the backlight assembly case to facilitate heat transfer from the TFT panel to the backlight assembly case; and
    wherein the backlight assembly case ends at an axially-extending portion and an inwardly-extending portion, wherein the outer edge of the TFT panel directly contacts the axially-extending portion and the first surface directly contacts the inwardly-extending portion.

18. The HUD device of claim 17, wherein the backlight assembly case is made of a material having a thermal conductivity exceeding 15 W/mK and an emissivity of at least 0.8.

* * * * *